(No Model.)
J. B. APPLE.
UNDERGROUND CONDUIT FOR TELEGRAPH, TELEPHONE, AND OTHER WIRES.
No. 261,649. Patented July 25, 1882.
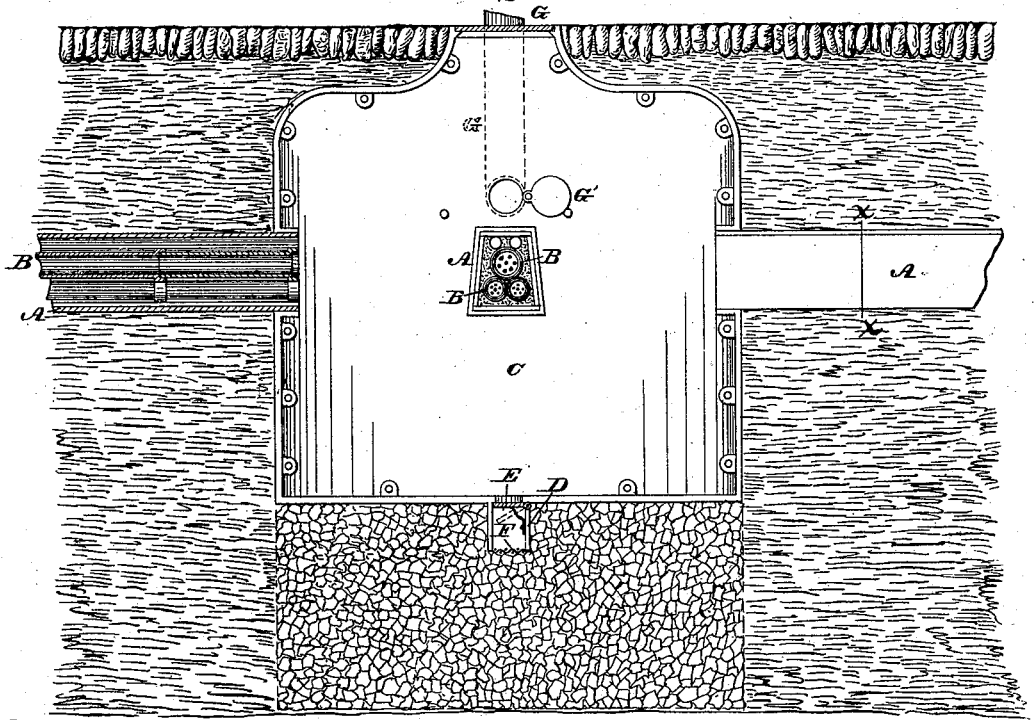
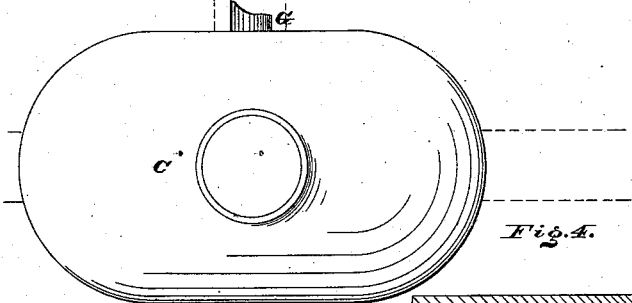
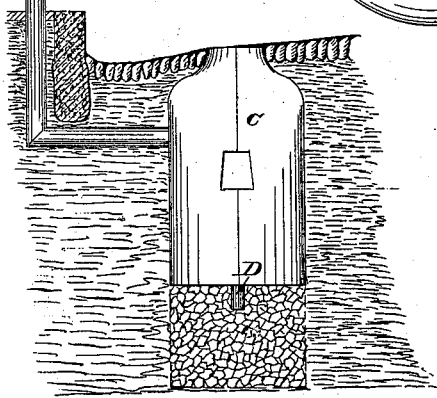
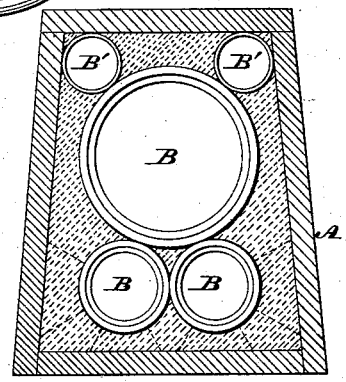
WITNESSES:
INVENTOR:
J. Bernard Apple,
BY John A. Diedersheim
ATTORNEY.

UNITED STATES PATENT OFFICE.

J. BERNARD APPLE, OF PHILADELPHIA, PENNSYLVANIA, ASSIGNOR OF ONE-HALF TO WILLIAM S. HASSALL, OF SAME PLACE.

UNDERGROUND CONDUIT FOR TELEGRAPH, TELEPHONE, AND OTHER WIRES.

SPECIFICATION forming part of Letters Patent No. 261,649, dated July 25, 1882.

Application filed November 8, 1881. (No model.)

*To all whom it may concern:*

Be it known that I, J. BERNARD APPLE, a citizen of the United States, residing in the city and county of Philadelphia, State of Pennsylvania, have invented a new and useful Improvement in Underground Conduits for Telegraph, Telephone, and other Wires, which improvement is fully set forth in the following specification and accompanying drawings, in which—

Figure 1 is a partial side elevation and vertical section of the conduit embodying my invention. Fig. 2 is a top or plan view of the testing-case or testing-station. Fig. 3 is an end view of Fig. 1 on a reduced scale. Fig. 4 is a vertical section of the portion in line $x\ x$, Fig. 1, enlarged.

Similar letters of reference indicate corresponding parts in the several figures.

My invention consists of a testing case or station provided with a pipe having an upwardly-closing valve and strainer for allowing the escape of water from the station and preventing the entrance of water and vermin into the station from below.

It also consists of the drain-pipe and valve, in combination with the testing-station and the bed which supports the station, but allows the water to trickle through it from said pipe without undermining.

Referring to the drawings, A represents a wooden trough, which is adapted to be laid in a trench along the route of a line of wires designed for telegraph, telephone, electric-light, and other purposes, said box being properly coated inside and outside with coal-tar, which protects and preserves the box from the injurious action of the ground and vermin.

B represents wire-receiving pipes, which, formed preferably of cement, are placed in the trough A and enveloped in suitable plaster, which is poured into the trough A and run around the pipes, so as to completely inclose the same, it being noticed that a sufficient number of troughs are arranged end to end and the pipes therein are coupled so as to form a continuous length of troughs and pipe.

At intervals of the route, cross-streets, &c., are located testing-cases or testing-stations C, which are formed in sections bolted together, preferably cast-iron, the joint being made water-tight by Roman cement, the testing-case being supported on a firm bed and having its top opening, through which access may be had, covered by a suitable water-tight cap or lid.

One of the sections of a testing-station is shown in Fig. 1, provided on its inner edges with perforated lugs, which are arranged to fit against the corresponding lugs of the other section of said station. Bolts or other fastenings are passed through the holes of said lugs when thus in position, and the sectional station is thereby fastened together, so as to form an entirety.

The ends of the conduits or troughs A at the testing-case open into the same, as seen in Fig. 1, and the wires in the pipe B at one side of the testing-case are connected to wires in the opposite side of the testing-case, or are continuous of each other. The testing-case may be tapped or have pieces removed from its side for the attachment of cross-lines; and as the wires may be inspected, tested, &c., in the testing-case, the latter will be found to be of a convenient and serviceable nature, and as it is strong and durable, it may remain in position without removal for repairs or replacement for a long period of time.

In the base of the testing-case is an opening, with which communicates a pipe, D, opening downward into the ground or bed below the testing-case. In the top of the pipe is an upwardly-closing valve, E, and in the bottom of said pipe is a strainer, F.

It will be seen that should moisture collect or water enter the testing-case from the top or sides, the same may run off through the pipe D, the valve readily opening to permit such escape. The water leaving said pipe enters the bed above referred to, which consists of a quantity of small pieces of stone, or any other suitable material, through which the water percolates without in any way undermining the testing-station. Should, however, water seek to enter the man-hole through the pipe D, the valve E immediately closes on its seat and prevents such entrance of water, the strainer serving to guard the pipe from passage of improper objects, insects, dirt, &c., thereinto.

G represents a pipe, (a number of which may be employed,) which opens into the side of the testing-case and extends upwardly, so as to have its top above the street or pavement. By this provision fresh air may be admitted to the conduit-pipes and the testing-case and foul air removed therefrom, thus assisting in preserving the wires. When it is required to close the pipe G it is accomplished by means of a cap or cover, G', at either end thereof, that shown being on the end within the testing-case.

When it is required to make connections for cross-lines in the length of the conduits between the testing-cases the trough A is uncovered, and by suitable tools said trough and the pipes B may be pierced, and through the openings the cross-line conduits may be attached and secured in position.

In Figs. 1 and 4 I show pipes B', located in the trough A above the pipes B, said pipes B' serving as pneumatic tubes, and they are properly packed and connected, forming reliable means for execution of their respective purposes.

The trough A may be coated with other material than coal-tar for preservative purposes, and the plaster or other suitable material which is employed as a packing or filling to envelop the pipe B is preferably mixed with water, so as to be in form of paste, which may be run around the pipes so as to completely envelop them.

I am aware that Roman and other cement has been employed as a filling or packing for conduits of electric wires; but the same is not of an absorbent nature, as is plaster, said cement serving first to hold the water at the surface of the cement in contact with the inclosing-trough, the water then softening and injuring the cement. After water is absorbed by plaster it evaporates, and does not affect or injure the plaster. Furthermore, the plaster, owing to its yielding nature, may be cut through from the outside of the trough in a convenient and easy manner for tapping the pipes, unlike Roman cement, whose hardness makes it difficult of working, especially underground.

Having thus described my invention, what I claim as new, and desire to secure by Letters Patent, is—

1. A testing case or station for electric-wire conduits, supported on a firm porous bed, and provided with the pipe D, having an upwardly-closing valve, E, and strainer F, substantially as and for the purpose set forth.

2. The drain-pipe D and valve E, in combination with the testing-station and the bed which supports the station, but allows water to trickle through it from said pipe without undermining, substantially as and for the purpose set forth.

The above specification of my invention signed by me this 2d day of November, A. D. 1881.

J. BERNARD APPLE.

Witnesses:
JOHN A. WIEDERSHEIM,
W. F. KIRCHER.